June 1, 1965     K. V. PALMAER     3,186,535

FLANGED CONVEYOR BELT

Filed June 12, 1961

INVENTOR:
KARL V. PALMAER
BY
ATTORNEYS

3,186,535
FLANGED CONVEYOR BELT
Karl V. Palmaer, Walnut Creek, Calif., assignor to The Monobelting Corp, Oakland, Calif., a corporation of California
Filed June 12, 1961, Ser. No. 116,553
1 Claim. (Cl. 198—201)

This invention relates to and in general has for its object the provision of an endless flanged conveyor belt wherein the abutting ends of the belting from which the belt is made is provided with flange guards or clips.

Continuous flanged conveyor belts are made from a section of belting by bringing the two ends thereof together and splicing such ends. Although various well-known devices are available for this purpose, no good way has ever been developed for bonding the contiguous ends of the belt flanges per se. As a result of this, the free contiguous ends of the flanges open and close during the travel of the spliced ends of the belt about the end pulleys on which the belt is supported. This presents a hazard to operators working around the end pulleys, for hands, fingers, clothing and other objects can be pinched between the adjacent flange ends as the latter close upon themselves.

More specifically, one of the objects of this invention is the provision, in a flanged belt, of saddle-shaped guards disposed over the contiguous ends of the belt flanges and anchored to the belt splicing.

The invention possesses other advantageous features, some of which, with the foregoing, will be set forth at length in the following description where that form of the invention which has been selected for illustration in the drawings accompanying and forming a part of the present specification is outlined in full. In said drawings, one form of the invention is shown, but it is to be understood that it is not limited to such form, since the invention as set forth in the claim may be embodied in other forms.

Referring to the drawings.

Figure 1:
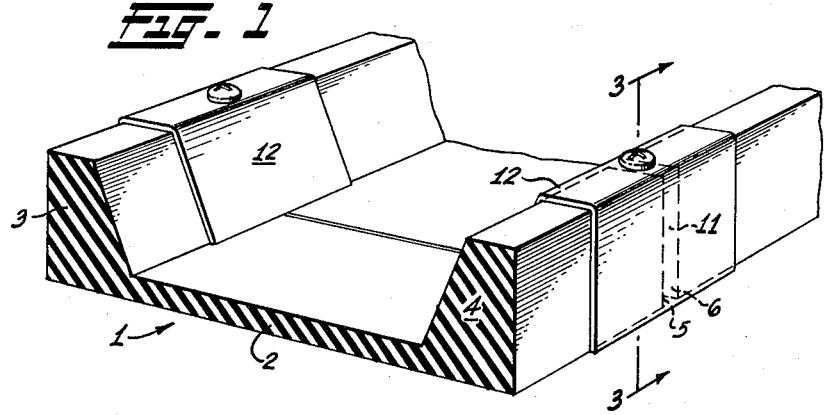
FIG. 1 is a perspective view of a section of a flanged conveyor belt embodying the objects of my invention.

As illustrated in these various figures, the guard of my invention has been applied to a conveyor belt generally designated by the reference numeral 1 and including a base section 2 and integral side flanges 3 and 4. Joining the adjacent free ends 5 and 6 of the base section 2 is a conventional elongated clamping clip 7 provided along its opposed edges with teeth 8 embedded in the section 2 adjacent the meeting edges thereof. Formed in each end of the clip 7 is a recess 9.

Straddling each of the flanges 3 and 4 and centered over the crack 11 defined by the adjacent free ends of its flange is a saddle-shaped guard 12, preferably made of fabric-reinforced fiberglass and having a contour complementary to the contour of its associated flange.

Extending through the top of each guard 12 centrally thereof and through one of the cracks 11 is a bolt 13, the threaded lower end thereof being receivable in one of the clip recesses 9. Threaded on the lower end of the bolt 13 within the confines of the recess 9 is a nut 14, this structure serving to securely clamp the guard 12 to and over the adjoining ends of its associated flange. Preferably, the upper corners of the free ends of the flanges are rounded as at 15 so as to more readily permit these corners to move along the lower surface of the guard tops when the spliced portion of the belt is passing over the pulley 16 as shown in FIG. 2.

Figure 2:
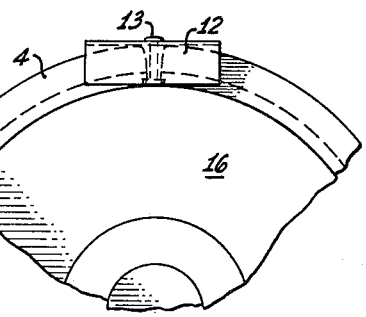
FIG. 2 is a reduced fragmentary side view of a flanged conveyor belt of the character illustrated in FIG. 1 and shown in its operative position passing about an end pulley.
Figure 3:
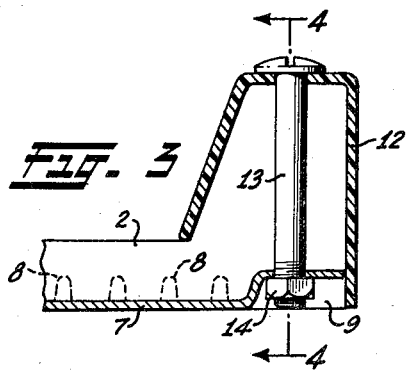
FIG. 3 is a fragmentary vertical section taken on the section line 3—3 of FIG. 1 with portions thereof broken away.
Figure 4:
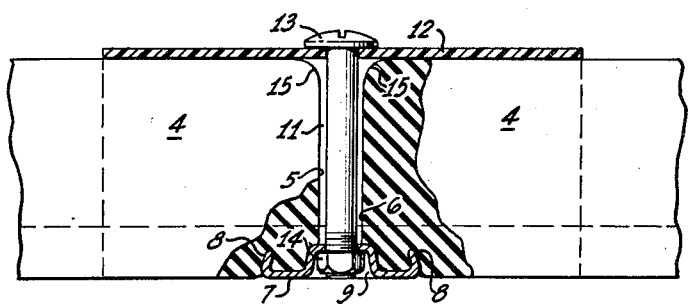
FIG. 4 is a fragmentary vertical section taken on the section line 4—4 of FIG. 3.

When the belt splice and flange joint guards are in this position, the belt and its flanges are under stress and the contiguous flange ends separate from each other as shown in FIG. 2 and in effect form a pair of diverging jaws. As this portion of the belt leaves the pulley 16 these jaws move towards each other, thus producing a pincher or clamping action. However, the guards 12 are of such a length that they substantially overlap the ends of their associated flanges and so are always in a position to cover the gap between the adjoining free ends of each flange. As a result of this construction, accidental inclusion of any object between the adjacent free ends of the flanges is precluded and, perforce, any accidents resulting therefrom.

I claim:

In combination: a conveyor belt having an integral flange and a base section; a clamping clip splicing adjacent ends of said conveyor belt along said base section; guard means of a cross-section generally complementary to the shape of said flange and of a generally uniform length substantially greater than the gap between the adjacent ends of said flange at said splice; and fastening means positioned in said gap and securing said guard means to said clamping clip.

References Cited by the Examiner

UNITED STATES PATENTS

| D. 24,679 | 9/95 | Spadone | 198—201 X |
|---|---|---|---|
| 284,324 | 9/83 | Parker et al. | 198—201 |
| 308,875 | 12/84 | Burt | 24—31 X |
| 1,899,766 | 2/33 | McWilliams | 198—201 X |

FOREIGN PATENTS 494,919  6/19  France.

SAMUEL F. COLEMAN, *Primary Examiner.*
JULIUS E. WEST, ERNEST A. FALLER, Jr.,
*Examiners.*